(12) United States Patent
Rosca et al.

(10) Patent No.: US 10,160,837 B2
(45) Date of Patent: Dec. 25, 2018

(54) NANOLEVEL DISPERSION OF NANOPARTICLES IN HYDROPHOBIC MATERIALS

(71) Applicant: Bell Helicopter Textron Inc., Fort Worth, TX (US)

(72) Inventors: Iosif Daniel Rosca, Saint Hubert (CA); Martin Salameh, Laval (CA); Suong Van Hoa, Brossard (CA)

(73) Assignee: Bell Helicopter Textron Inc., Fort Worth, TX (US)

(*) Notice: Subject to any disclaimer, the term of this patent is extended or adjusted under 35 U.S.C. 154(b) by 0 days.

(21) Appl. No.: 15/847,753

(22) Filed: Dec. 19, 2017

(65) Prior Publication Data

US 2018/0134853 A1    May 17, 2018

Related U.S. Application Data

(62) Division of application No. 14/204,475, filed on Mar. 11, 2014, now Pat. No. 9,845,381.

(51) Int. Cl.
*B64D 15/00* (2006.01)
*C08J 3/205* (2006.01)

(52) U.S. Cl.
CPC ............ *C08J 3/2053* (2013.01); *B64D 15/00* (2013.01); *B64C 2230/26* (2013.01); *C08J 2401/02* (2013.01); *Y02T 50/166* (2013.01)

(58) Field of Classification Search
CPC .............. C08J 3/20; C08J 3/005; B64D 15/00
See application file for complete search history.

(56) References Cited

U.S. PATENT DOCUMENTS

| 7,153,357 B2 * | 12/2006 | Baumgart | C08G 18/6254 106/481 |
| 9,447,260 B2 * | 9/2016 | Gruber | B82Y 30/00 |
| 2003/0185990 A1 * | 10/2003 | Bittner | B05D 7/16 427/385.5 |
| 2009/0136741 A1 * | 5/2009 | Zhang | B08B 17/06 428/328 |
| 2011/0210014 A1 * | 9/2011 | Garosshen | G01N 27/121 205/776.5 |

* cited by examiner

*Primary Examiner* — Justin M Benedik
(74) *Attorney, Agent, or Firm* — Lightfoot & Alford PLLC

(57) ABSTRACT

According to one embodiment, a method of dispersing nanoparticles into a destination material includes providing a plurality of nanoparticles suspended in a carrier, adding a solvent to the plurality of nanoparticles suspended in a carrier, removing at least some of the carrier to yield the plurality of nanoparticles suspended in the solvent, mixing the nanoparticles suspended in the solvent with a destination material, and removing at least some of the solvent from the mixture of nanoparticles suspended in the solvent and the destination material.

10 Claims, 1 Drawing Sheet

NANOLEVEL DISPERSION OF NANOPARTICLES IN HYDROPHOBIC MATERIALS

CROSS-REFERENCE TO RELATED APPLICATIONS

This is a divisional application Ser. No. 14/204,475, which was filed on 11 Mar. 2014 and entitled "NANOLEVEL DISPERSION OF NANOPARTICLES IN HYDROPHOBIC MATERIALS."

TECHNICAL FIELD

This invention relates generally to aerospace materials, and more particularly, to nanolevel dispersion of nanoparticles in hydrophobic materials.

BACKGROUND

A rotorcraft may include one or more rotor systems. One example of a rotorcraft rotor system is a main rotor system. A main rotor system may generate aerodynamic lift to support the weight of the rotorcraft in flight and thrust to counteract aerodynamic drag and move the rotorcraft in forward flight. Another example of a rotorcraft rotor system is a tail rotor system. A tail rotor system may generate thrust in the same direction as the main rotor system's rotation to counter the torque effect created by the main rotor system.

An aircraft, such as a rotorcraft, may include a variety of different materials that may be subject to extreme conditions during operation of the aircraft. Examples of such materials may include, but are not limited to, paints, primers, and adhesives.

SUMMARY

Teachings of certain embodiments recognize the capability to improve material performance (e.g., improved flexibility and compressibility and improved resistance to ultraviolet radiation) by adding nanoparticles to the material. Teachings of certain embodiments recognize the capability to disperse nanoparticles in hydrophobic materials while preserving nano-level suspension.

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which.

DETAILED DESCRIPTION OF THE DRAWINGS

Figure 1:
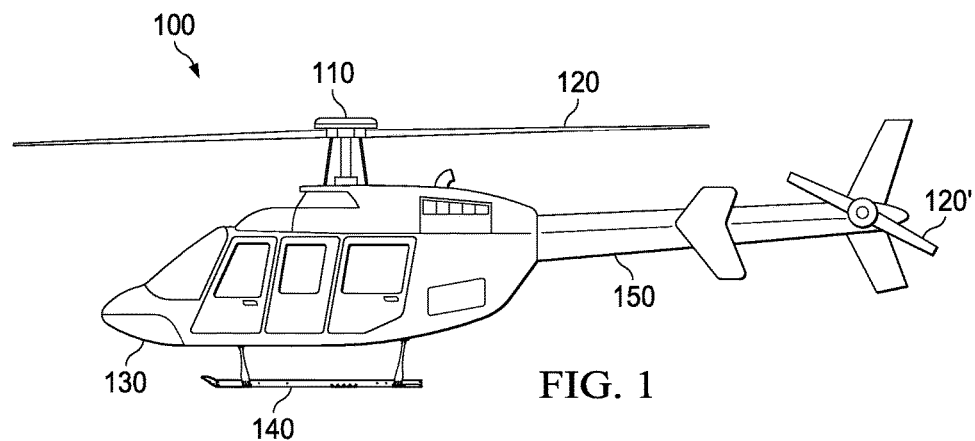
FIG. 1 shows a rotorcraft according to one example embodiment.

FIG. 1 shows a rotorcraft 100 according to one example embodiment. Rotorcraft 100 features a rotor system 110, blades 120, a fuselage 130, a landing gear 140, and an empennage 150. Rotor system 110 may rotate blades 120. Rotor system 110 may include a control system for selectively controlling the pitch of each blade 120 in order to selectively control direction, thrust, and lift of rotorcraft 100. Fuselage 130 represents the body of rotorcraft 100 and may be coupled to rotor system 110 such that rotor system 110 and blades 120 may move fuselage 130 through the air. Landing gear 140 supports rotorcraft 100 when rotorcraft 100 is landing and/or when rotorcraft 100 is at rest on the ground. Empennage 150 represents the tail section of the aircraft and features components of a rotor system 110 and blades 120'. Blades 120' may provide thrust in the same direction as the rotation of blades 120 so as to counter the torque effect created by rotor system 110 and blades 120. Teachings of certain embodiments relating to rotor systems described herein may apply to rotor system 110 and/or other rotor systems, such as other tilt rotor and helicopter rotor systems. It should also be appreciated that teachings from rotorcraft 100 may apply to aircraft other than rotorcraft, such as airplanes and unmanned aircraft, to name a few examples.

An aircraft such as a rotorcraft 100 may include a variety of different materials that may be subject to extreme conditions during operation of the aircraft. Examples of such materials may include, but are not limited to, paints, primers, sealants, acrylics, polycarbonates, adhesives, potting compounds, glycerol, curing agents such as amines, thermoset resins, epoxies, polyester, vinyl esters, thermoplastics, and elasotmers such as rubbers. Teachings of certain embodiments recognize the capability to improve material performance (e.g., improved flexibility and compressibility and improved resistance to ultraviolet radiation and to particulate) by adding nanoparticles to the material. Examples of nanoparticles may include nano crystalline cellulose particles (NCCs), cellulose nanocrystals (CNCs), cellulose nanofibrils (CNFs), or nanofibrillated cellulose (NFC).

Nanoparticles may be added to a destination material by transferring the nanoparticles from a carrier substance to the destination material. Typically the carrier substance is water. For example, CNCs are typically produced as water suspensions. Teachings of certain embodiments recognize the benefit of using never-dried CNC suspensions in order to preserve nano-level suspension. Many destination materials, however, are hydrophobic. For example, the most organic materials are hydrophobic. Thus, it may not be possible to directly transfer nanoparticles from an aqueous suspension to a hydrophobic destination material without transferring water into the hydrophobic material.

Some methods of transferring nanoparticles may have undesirable consequences. For example, using spray or freeze-dried particles may be undesirable because the CNC particles often come in the form of large agglomerates (larger than 10 microns) that are practically impossible to break down efficiently at the nano level (e.g., 100 nanometers), therefore making it impossible to unleash the potential of the CNCs. As another example, any process that includes shaking the nanoparticles loose may result in undesirable microparticles. As yet another example, some sol-gel methods for solvent exchange are slow and inefficient as they are diffusion controlled and can only handle low CNC loadings (e.g., less than one percent-by-weight).

Figure 2:
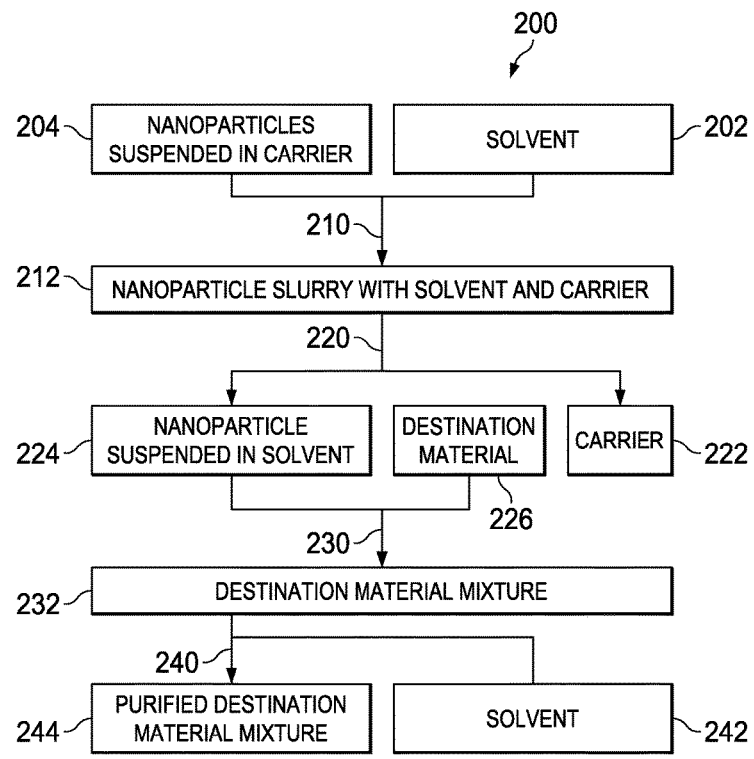
FIG. 2 shows a method for transferring nanoparticles into a destination material (such as a material for application on an aircraft such as the rotorcraft of FIG. 1).

Teachings of certain embodiments recognize, however, the capability to transfer nanoparticles from an aqueous suspension to a hydrophobic destination material while preserving the nano-level dispersion and avoiding particle aggregation. For example, FIG. 2 shows a method 200 for transferring nanoparticles into a destination material using one or more solvents.

At step 210, a solvent 202 is added to nanoparticles suspended in carrier 204 to yield a nanoparticle slurry 212 that contains both solvent and carrier. In some embodiments, solvent 202 may be soluble in the carrier as well as in the destination material. Teachings of certain embodiments recognize the use of higher-volatility solvents (e.g., $t_B$=56 degrees) such as acetone, tetrahydrofuran (THF), methyl ethyl ketone (MEK), and dichloromethane (DCM). Examples of nanoparticles suspended in carrier 204 may include nano crystalline cellulose particles (NCCs), cellulose nanocrystals (CNCs), cellulose nanofibrils (CNFs), or nanofibrillated cellulose (NFC).

At step 220, at least some of the carrier 222 is removed from the nanoparticle slurry 212 to yield nanoparticles suspended in solvent 224. In one example embodiment, carrier 222 is removed by sequential dilution with solvent 202, such as acetone. In this example, solvent 202 and nanoparticle suspension 204 are mixed in a given volume/weight ratio (e.g., 200 mL of acetone and 100 grams of CNC suspension) and sonicated for a certain length of time (e.g., for 2-4 minutes) in order to facilitate the CNC dispersion in the solvent/carrier mixture and to promote gel formation. Using lower solvent/suspension ratios may increase the number of steps and solvent consumption, whereas using higher ratio values may reduce the gelling capacity of the solvent and thus make filtration more difficult. Teachings of certain embodiments recognize that using sonication to intensify solvent exchange and promote gelation may substantially reduce the amount of time necessary to perform solvent exchange (e.g., from 3-7 days down to a few hours) and can handle higher CNC loadings (e.g., greater than ten percent-by-weight).

Next, the gel is compacted by, for example, using simple gravitational filtering over a 100 mesh wire cloth or using a centrifuge operating at 15000 revolutions per minute. After compaction, some solvent/carrier mixture may be discarded, and a new portion of solvent may be added to the remaining solvent/carrier/nanoparticle slurry. This process of solvent-adding/sonication/compaction may be repeated multiple times. In some scenarios, the process may be repeated up to six times for gravitational filtration and up to three times for the centrifugation until the carrier content of the resulting slurry is lower than 1.5 percent-by-weight.

The amount of solvent necessary to complete the transfer may change as a function of nanoparticle concentration in the carrier. For example, the amount of solvent needed may be significantly reduced if the concentration of nanoparticles is increased from 4-6% to 15-30%.

At step 230, the nanoparticles suspended in solvent 224 is mixed with a destination material 226 to yield a destination material mixture 232. Examples of destination material 226 may include paints, primers, sealants, acrylics, polycarbonates, adhesives, potting compounds, glycerol, curing agents such as amines, thermoset resins, epoxies, polyester, vinyl esters, thermoplastics, and elasotmers such as rubbers. In some embodiments, the nanoparticles suspended in solvent 224 may be mixed with the destination material 226 under sonication to improve transfer of the nanoparticles from the solvent to the destination material.

At step 240, at least some solvent 242 is removed from the destination material mixture 232 to yield purified destination material mixture 244. In some embodiments, at least some solvent 242 may be removed through vacuum mixing the destination material mixture 232. The resulting purified destination material mixture 244 may contain nanoparticles dispersed at the nano-level in the destination material. The destination material mixture 244 may also contain traces of solvent that could be further removed. After step 240, the destination material mixture 244 may be ready for application, such as application to the body of rotorcraft 100.

In some embodiments, multiple solvents may be used to facilitate the transfer of nanoparticles from a carrier to a destination material. For example, in one embodiment, a primary solvent, such as acetone, may be used to transfer nanoparticles from the carrier to the primary solvent. Then the nanoparticles may be transferred from the primary solvent to a secondary solvent, such as THF or MEK. Finally, the nanoparticles may be transferred from the secondary solvent to the destination material.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order.

Although several embodiments have been illustrated and described in detail, it will be recognized that substitutions and alterations are possible without departing from the spirit and scope of the present invention, as defined by the appended claims.

To aid the Patent Office, and any readers of any patent issued on this application in interpreting the claims appended hereto, applicants wish to note that they do not intend any of the appended claims to invoke paragraph 6 of 35 U.S.C. § 112 as it exists on the date of filing hereof unless the words "means for" or "step for" are explicitly used in the particular claim.

What is claimed is:

1. A method of dispersing nanoparticles into a destination material, comprising:
   providing a plurality of hydrophilic nanoparticles suspended in a carrier;
   adding a solvent to the plurality of hydrophilic nanoparticles suspended in a carrier;
   removing at least some of the carrier to yield the plurality of nanoparticles suspended in the solvent;
   mixing the nanoparticles suspended in the solvent with a destination material; and
   removing at least some of the solvent from the mixture of nanoparticles suspended in the solvent and the destination material.

2. The method of claim 1, wherein the nanoparticles comprise nano crystalline cellulose particles or cellulose nanocrystals.

3. The method of claim 1, wherein the solvent is soluble in the carrier and soluble destination material.

4. The method of claim 1, wherein the solvent is acetone.

5. The method of claim 1, wherein removing the carrier to yield the plurality of nanoparticles suspended in the solvent comprises:
   sonicating the solvent and the plurality of nanoparticles suspended in the carrier to yield a sonicated gel; and
   filtering at least some of the carrier out of the sonicated gel.

6. The method of claim 1, wherein removing at least some of the solvent from the mixture of nanoparticles suspended in the solvent and the destination material comprises vacuum mixing the mixture of nanoparticles suspended in the solvent and the destination material.

7. The method of claim 1, wherein the destination material is selected from the group consisting of paints, primers, sealants, acrylics, polycarbonates, adhesives, potting compounds, glycerol, curing agents such as amines, thermoset esters, thermoplastics, resins, epoxies, polyester, vinyl and elastomers such as rubbers.

8. The method of claim 1, wherein:
removing at least some of the carrier to yield the solvent plurality of nanoparticles suspended in the solvent comprises:
   removing at least some of the carrier to yield the plurality of nanoparticles suspended in a primary solvent;
   adding a secondary solvent to the plurality of nanoparticles suspended in the primary solvent;
   removing at least some of the primary solvent to yield the plurality of nanoparticles suspended in the secondary solvent;
mixing the nanoparticles suspended in the solvent with a destination material comprises mixing the nanoparticles suspended in the secondary solvent with a destination material; and
removing at least some of the solvent from the mixture of nanoparticles suspended in the solvent and the destination material comprises removing at least some of the secondary solvent from the mixture of nanoparticles suspended in the solvent and the destination material.

9. The method of claim 8, wherein the secondary solvent is soluble in the primary solvent and soluble destination material.

10. The method of claim 8, wherein the secondary solvent is tetrahydrofuran (THF) or methyl ethyl ketone (MEK).

* * * * *